Patented Feb. 9, 1932

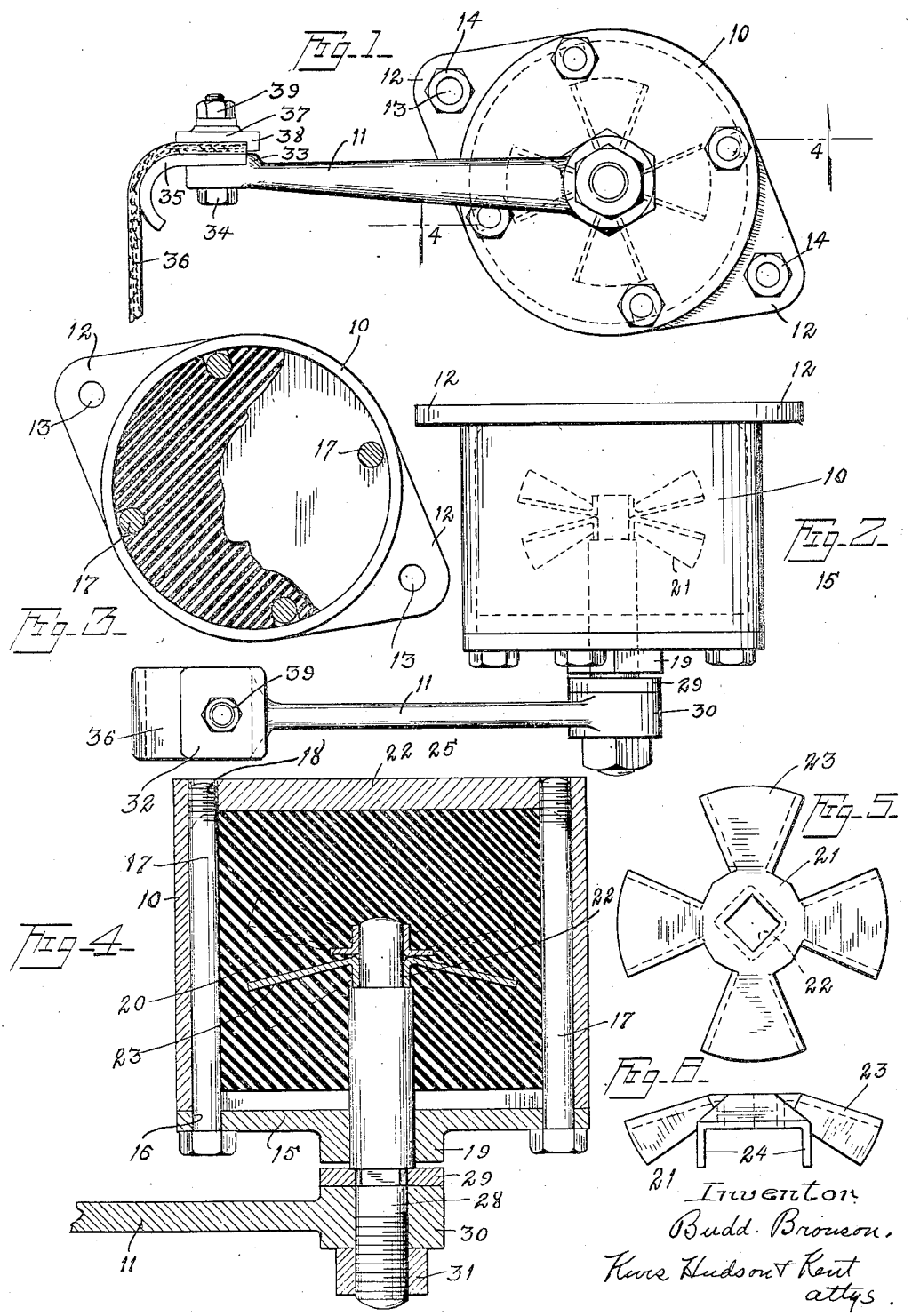

1,844,200

UNITED STATES PATENT OFFICE

BUDD BRONSON, OF LAKEWOOD, OHIO, ASSIGNOR TO THE OHIO RUBBER COMPANY, OF CLEVELAND, OHIO, A CORPORATION OF OHIO

SHOCK ABSORBER

Application filed August 2, 1928. Serial No. 296,934.

This invention relates to a shock absorber of the type adapted to be used with a motor vehicle frame and the axles thereof.

An object of the invention is to provide a shock absorber of simple design having a relatively few number of parts and capable of economic manufacture.

Another object is to provide a shock absorber which will not require constant adjustment and lubrication and wherein the operative parts may be readily assembled and disassembled for repair or replacement.

Additional objects and advantages will appear hereinafter as the description of the invention proceeds.

An embodiment of the invention is illustrated in the accompanying drawings wherein:

Fig. 1 is a side elevational view of the shock absorber when the same is assembled upon the frame of a motor vehicle, one fan member only being shown in this view;

Fig. 2 is a top plan view of the shock absorber as shown in Fig. 1 two fan members being shown, however, in this view;

Fig. 3 is a detail view of the shock absorber casing or container with the cover removed;

Fig. 4 is a transverse sectional view taken approximately on line 4—4 of Fig. 1, but showing two fan members; and Figs. 5 and 6 are detail views.

The device comprises, in general, the casing or container 10 which houses the shock absorbing and resisting elements, and the actuating arm 11 which is connected to such elements and with the axle to cause operation of the former. The casing or container 10 is a substantially cylindrical member provided at one end with outstanding attaching lugs 12 having openings 13 for the passage of securing member 14 which secure the casing to the frame of the vehicle, while its outer circumference adjacent the other or open end is provided with a cover plate 15. This plate has openings 16 adapted to receive through bolts 17 which preferably extend upwardly through a block of rubber-resisting material 20 within the casing 10 to prevent relative rotation therebetween, the upper ends of the bolts being in screw-threaded engagement with openings 18 in the closed end of the casing 10. The cover 15 is annular in shape and has a centrally arranged boss 19 provided with an opening for the purpose later to be described.

The shock absorbing and resisting elements of the shock absorber comprise a block 20, of rubber or other resilient material, adapted to fit within the casing or container and provided with longitudinal grooves within which engage the bolts 17 of the container, whereby the block and container are held in non-rotative relationship. Embedded or vulcanized within the block 20 are a plurality of shock transmitting members 21, which may vary in number and form, being, however, in the present embodiment two in number, and of substantially fan shape. These members are embedded or vulcanized in the block adjacent the center thereof and are so arranged as to be located substantially centrally of the block. The members are formed of steel stampings and are shaped in the nature of a fan so that they have a central hub portion provided with a rectangular opening, the periphery of which is flanged to form an outstanding flange bearing 22 while the arms 23 of the fan extend radially from the hub portion and at an angle thereto, such arms having their longitudinal edges flanged at 24. Although the fans shown in the present embodiment have four blades or arms, it should be understood that the number of such arms is optional and may vary as desired. The members 21 are arranged in the block back-to-back so that the arms of one will extend angularly in one direction with respect to the longitudinal axis of the block while the arms of the other will extend angularly in the opposite longitudinal direction of the block, the arms of each member preferably being arranged so as to be in alignment with the openings between the arms of the other member. When the fans or member 21 are thus arranged back-to-back, the bearing flanges 22 of the rectangular openings in the hub form a continuous bearing within which fits a rectangular portion 25 of a shaft 26. The rectangular portion 25 of the shaft is arranged adjacent one end thereof and is of such length that it will extend somewhat above the top bearing flange 22 and will terminate below the bottom of the casing or container when the end of the lower bearing flange 22 is in engagement with the shoulder 27 formed by the enlarged portion of the shaft. The intermediate enlarged portion of the shaft is cylindrical in shape and extends centrally through the block and the boss of the casing or cover, while the outer end 28 of the shaft is reduced and threaded for the reception of the elements now to be described.

A ratchet washer 29 provided with teeth on its outer surface and with a centrally arranged internally threaded opening is screwed upon the reduced threaded end 28 of the shaft until it is in engagement with the shoulder formed by the end of the intermediate enlarged portion of the shaft, which end is located a slight distance beyond the end of the boss 19 of the cover. The actuating arm 11 is provided at one end with an enlargement 30 having a central opening adapted to fit over the threaded portion 28 of the shaft and also having one face provided with ratchet teeth adapted to engage with the ratchet teeth of the adjacent face of the ratchet washer. This engagement is effected by a nut 31 screwed upon the outer end of the threaded portion 28 of the shaft and, of course, held against movement by a suitable lock washer or other means.

The opposite end of the arm 11 is provided with a squared portion 32 at the inner side of which is an upwardly extending lug 33. This squared portion 32 has a central opening formed therein through which passes a bolt 34 for holding in engagement with such portion a curved filler piece 35, one end of a flexible connecting element 36 and a clamp member 37. The flat end of the filler piece 35 fits upon the upper side of the squared portion 32 and engages the lug 33, while the clamp 37 has a downwardly extending lug 38 along one of its edges adapted to bear upon the top of the lug 33. When the flexible connecting member 36 is interposed between the filler and the clamp and a nut 39 tightened or screwed down upon the bolt 34 it is apparent that such flexible member will be securely clamped to the outer end of the actuating arm 11 and guided downwardly by the curved portion of the filler member toward the axle of the vehicle.

When the device has been assembled upon the vehicle, as shown in Fig. 1, movement of the axle thereof will be transmitted through the flexible element 36 to the actuating arm 11 which, in turn, will cause the shaft 26 to oscillate in the block 20 thereby rotating or oscillating the fan members 21, which are embedded in the block and within the hub portions of which the squared end 25 of the shaft is non-rotatably engaged. It should be noted that these fan members and their arms are completely embedded in the block of resilient material and since the arms are provided with the flanges 24, and also because the arms of the fans extend in opposite directions, such members engage the resilient block over a large surface and thereby have their movement resisted by the block throughout a large area. Because of this large area of resistance, substantially the entire resisting force of the block is utilized, thereby prolonging the life of the block since the wear thereon is well distributed.

The device just described is readily assembled and contains no metal-to-metal operative elements within the casing, thus obviating the necessity of lubrication.

Although a preferred embodiment of the invention has been illustrated and described it should be understood that the invention is not limited thereto but may assume various modifications and adaptations within the scope of the following claims.

Having thus described my invention, I claim:

1. A shock absorber comprising a casing adapted to be secured to a vehicle frame, a block of resilient material non-rotatably arranged in said casing, a plurality of fan members having relatively large block-engaging blades embedded in said block with the blades of one fan member aligning with the spaces between the blades of another fan member, and a shaft extending through said block and operatively associated with said fan members whereby oscillation of said shaft and the operatively associated fan members will be resisted and absorbed by said block.

2. A shock absorber comprising a casing adapted to be secured to a vehicle frame, a block of resilient material non-rotatably arranged in said casing, a plurality of separate fan-like members embedded in said block having flanged blades, a shaft extending into said block and operatively associated with said members, and means adapted to connect said shaft with a vehicle axle whereby certain relative movements between the vehicle frame and axle will actuate said shaft and members and such actuation of said shaft and members will be yieldingly resisted and absorbed by the block.

3. A shock absorber comprising a casing adapted to be secured to a vehicle frame, a block of resilient material non-rotatably arranged in said casing, a plurality of separate oppositely disposed fan-like members embedded in said block having flanged blades, a shaft extending into said block and operatively associated with said members, and means adapted to connect said shaft with a vehicle axle, whereby certain relative movements between the vehicle frame and the axle will actuate said shaft and members, and such actuation thereof will be yieldingly resisted and absorbed by the block.

4. A shock absorber comprising a casing adapted to be secured to a vehicle frame, a block of resilient material non-rotatably arranged in said casing, a fan-like member having a central hub portion and angularly disposed flanged arms extending therefrom embedded in said block, and a shaft extending into said block and operatively associated with the hub portion of said member, whereby oscillation of said shaft and said member will be resisted and absorbed by said block.

5. A shock absorber comprising a casing adapted to be secured to a vehicle frame, a block of resilient material non-rotatably arranged in said casing, a plurality of fan-like members having a central hub portion and angularly disposed flanged arms extending therefrom embedded in said block with the hub portions of adjacent members back-to-back, and a shaft extending into said block and operatively associated with the hub portions of said members whereby oscillation of said shaft and members will be yieldingly resisted and absorbed by said block.

6. A shock absorber comprising a casing adapted to be secured to a vehicle frame, a block of resilient material non-rotatably arranged in said casing, a plurality of fan-like members embedded in said block having a hub portion provided with a flanged central opening forming a bearing and angularly disposed flanged arms extending therefrom, said members being arranged with the hub portions of adjacent members back-to-back whereby the flanged openings therein form a continuous bearing opening and the arms extending therefrom are angularly disposed with respect to each other, a shaft extending into said block and said flanged openings of the members to operatively associate said shaft and members, one end of the shaft extending outwardly of the block and casing, and an actuating arm associated with the outwardly extending end of the shaft, whereby when said arm is connected to a vehicle axle certain relative movements between the vehicle frame and axle will actuate such shaft and members and said block will absorb and resist such movements of actuation.

In testimony whereof, I hereunto affix my signature.

BUDD BRONSON.